(12) United States Patent
Kim et al.

(10) Patent No.: US 10,773,606 B2
(45) Date of Patent: Sep. 15, 2020

(54) APPARATUS AND METHOD FOR DETECTING OBJECT IN VEHICLE

(71) Applicants: HYUNDAI MOTOR COMPANY, Seoul (KR); KIA MOTORS CORPORATION, Seoul (KR)

(72) Inventors: Eung Hwan Kim, Seoul (KR); Nam Woong Hur, Hwaseong-si (KR); Gyun Ha Kim, Incheon (KR); Sang Woo Ji, Yongin-si (KR); Seul Ki Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 352 days.

(21) Appl. No.: 15/988,635

(22) Filed: May 24, 2018

(65) Prior Publication Data

US 2019/0152346 A1 May 23, 2019

(30) Foreign Application Priority Data

Nov. 22, 2017 (KR) .................... 10-2017-0156339

(51) Int. Cl.
| | |
|---|---|
| *B60N 2/00* | (2006.01) |
| *B60N 2/02* | (2006.01) |
| *B60N 2/20* | (2006.01) |
| *G08B 21/22* | (2006.01) |
| *B60Q 3/80* | (2017.01) |
| *B60Q 9/00* | (2006.01) |

(52) U.S. Cl.
CPC ............ *B60N 2/002* (2013.01); *B60N 2/0224* (2013.01); *B60N 2/20* (2013.01); *B60Q 3/80* (2017.02); *B60Q 9/00* (2013.01)

(58) Field of Classification Search
CPC ........ B60N 2/002; B60N 2/0224; B60N 2/20; B60N 2/0244; B60Q 3/80; B60Q 9/00; G08B 21/24; G08B 21/22
USPC ........................................................ 701/1, 49
See application file for complete search history.

(56) References Cited

U.S. PATENT DOCUMENTS

| | | | | |
|---|---|---|---|---|
| 5,570,903 | A | * 11/1996 | Meister ................. | B60N 2/002 180/273 |
| 5,983,147 | A | * 11/1999 | Krumm .............. | G06K 9/00362 701/45 |
| 6,302,438 | B1 | * 10/2001 | Stopper, Jr. ......... | B60R 21/0154 280/735 |

(Continued)

FOREIGN PATENT DOCUMENTS

KR 20120023230 A * 3/2012

*Primary Examiner* — Jaime Figueroa
(74) *Attorney, Agent, or Firm* — Brinks Gilson & Lione

(57) ABSTRACT

The present disclosure provides an apparatus and a method for detecting an object in a vehicle. The apparatus includes a seat location determining device configured to determine whether a location of a front seat is a reference location, a seat location adjusting device configured to adjust the location of the front seat to the reference location depending on whether the seat location determining device determines that the location of the front seat is the reference location, an object detecting device configured to detect the object around a rear seat when the location of the front seat is in the reference location, and a warning controller configured to output a warning when the object detecting device detects the object around the rear seat.

20 Claims, 12 Drawing Sheets

(56) References Cited

U.S. PATENT DOCUMENTS

| | | | | |
|---|---|---|---|---|
| 6,480,616 B1* | 11/2002 | Hata | ............... | B60N 2/002 |
| | | | | 280/735 |
| 6,857,656 B2* | 2/2005 | Yasui | ............... | B60R 21/01534 |
| | | | | 180/272 |
| 6,947,071 B2* | 9/2005 | Eichmann | ............... | B60R 1/00 |
| | | | | 348/142 |
| 7,245,741 B1* | 7/2007 | Ertl | ............... | B60R 21/01538 |
| | | | | 180/277 |
| 7,386,372 B2* | 6/2008 | Breed | ............... | B60R 21/01536 |
| | | | | 340/436 |
| 7,492,923 B2* | 2/2009 | Bothe | ............... | B60N 2/002 |
| | | | | 280/733 |
| 8,059,867 B2* | 11/2011 | Aoki | ............... | B60R 1/00 |
| | | | | 382/103 |
| 9,908,482 B1* | 3/2018 | Falstrup | ............... | B60R 11/04 |
| 2005/0222719 A1* | 10/2005 | Fukuro | ............... | H03K 19/177 |
| | | | | 701/1 |
| 2006/0186651 A1* | 8/2006 | Aoki | ............... | B60R 21/01538 |
| | | | | 280/735 |
| 2006/0198626 A1* | 9/2006 | Nakamura | ............... | B60R 1/008 |
| | | | | 396/234 |
| 2009/0057111 A1* | 3/2009 | Ishikura | ............... | B60R 21/01516 |
| | | | | 200/61.58 R |
| 2015/0294144 A1* | 10/2015 | Konishi | ............... | G06T 1/0007 |
| | | | | 382/103 |
| 2016/0031342 A1* | 2/2016 | Camello | ............... | B60N 2/002 |
| | | | | 701/45 |
| 2016/0332538 A1* | 11/2016 | Rocha | ............... | B60N 2/06 |
| 2017/0237946 A1* | 8/2017 | Schofield | ............... | B60Q 1/503 |
| | | | | 348/148 |
| 2018/0029531 A1* | 2/2018 | Di Trapani | ............... | B60Q 3/233 |
| 2018/0210120 A1* | 7/2018 | Di Trapani | ............... | G02B 5/0284 |
| 2019/0299814 A1* | 10/2019 | Yetukuri | ............... | B60N 2/0232 |

* cited by examiner

APPARATUS AND METHOD FOR DETECTING OBJECT IN VEHICLE

CROSS-REFERENCE TO RELATED APPLICATION

The present application claims priority to and the benefit of Korean Patent Application No. 10-2017-0156339, filed on Nov. 22, 2017, which is incorporated herein by reference in its entirety.

FIELD

The present disclosure relates to an apparatus and a method for detecting an object in a vehicle.

BACKGROUND

The statements in this section merely provide background information related to the present disclosure and may not constitute prior art.

Recently, there have been demands for technologies such as detecting and warning a passenger, a companion animal, and/or the like if the passenger, the companion animal, and/or the like remains in a rear seat.

Thus, a system of having a radar sensor or the like around a room lamp in a vehicle and detecting a passenger and/or a companion animal which remains in a rear seat has been developed.

However, due to properties of the radar sensor, an iron product may be detected, but there may be a shadow region where an object which remains in a rear seat is not detected by a headrest, a seat frame, and the like if a driver or a passenger alights from a vehicle in a state where a driver seat or a passenger seat is inclined backward.

Particularly, if an infant, a companion animal, or the like with a small body is located in the shadow region, it may be difficult to detect them through the radar sensor.

SUMMARY

An aspect of the present disclosure provides an apparatus and method for detecting an object in a vehicle to reduce a shadow area and enhance the accuracy of detecting an object around a rear seat by a sensor by adjusting a location of a front seat before detecting the object around the rear seat by the sensor.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, an apparatus for detecting an object in a vehicle may include: a seat location determining device configured to determine whether a location of a front seat is a reference location, a seat location adjusting device configured to adjust the location of the front seat to the reference location depending on whether the seat location determining device determines that the location of the front seat is the reference location, an object detecting device configured to detect an object around a rear seat when the location of the front seat is the reference location, and a warning controller configured to output a warning when the object detecting device detects the object around the rear seat.

The apparatus may further include a storage configured to store location information of the front seat. The seat location determining device may be configured to determine whether the location of the front seat is the reference location based on the location information of the front seat.

The apparatus may further include a communication device configured to transmit and receive a signal with a power seat adjusting device in the vehicle. The seat location determining device may be configured to determine whether the location of the front seat is the reference location based on location information of the front seat that is received from the power seat adjusting device via the communication device.

The seat location determining device may be configured to control a sensor located between the front seat and the rear seat and determine whether the current location of the front seat is the reference location based on the location information of the front seat that is in a detection region of the sensor.

The seat location determining device may be configured to, detect the current location of the front seat and compare the location of the front seat with the reference location when passengers in the front seat exit the vehicle.

The reference location may include information regarding a reference position in the front-rear direction of the front seat; and information regarding a reference angle of a front seat backrest.

The seat location adjusting device may be configured to adjust a position in the front-rear direction of the front seat based on a difference between the position in the front-rear direction of the front seat and the reference position in the front-rear direction of the front seat.

The seat location adjusting device may be configured to adjust an angle of the front seat backrest based on a difference between the angle of the front seat backrest and the reference angle of the front seat backrest.

The seat location adjusting device may be configured to, return the location of the front seat that is adjusted by the seat location adjusting device to a previous location, when the object detecting device does not detect the object around the rear seat.

The warning controller may be configured to output the warning through at least one of a speaker or a vehicle lamp.

The warning controller may be configured to transmit a warning signal to at least one of a warning system in the vehicle, a smart key system in the vehicle, or a pre-registered portable terminal.

The object detecting device may be configured to control a sensor located between the front seat and the rear seat and detect the object around the rear seat via the sensor.

In another form of the present disclosure, a method for detecting an object in a vehicle may include: determining whether a current location of a front seat is a reference location, adjusting the location of the front seat to the reference location depending on whether the location of the front seat is the reference location, detecting the object around a rear seat when the location of the front seat is the reference location, and outputting a warning when the object is detected around the rear seat.

The method may further include storing location information of the front seat. The determining whether the location of the front seat is the reference location may be based on the location information of the front seat.

Determining whether the location of the front seat is the reference location may include receiving the location information of the front seat from a power seat adjusting device in the vehicle and determining whether the location of the front seat is the reference location based on the location information of the front seat.

Determining whether the location of the front seat is the reference location may include controlling a sensor and determining whether the location of the front seat is the reference location based on the location information of the front seat that is detected in a detection region of the sensor.

The method may further include, detecting the location of the front seat and comparing the location of the front seat with the reference location, when passengers in the front seat exit the vehicle before determining whether the location of the front seat is the reference location.

Adjusting the location of the front seat to the reference location may include adjusting a position in a front-rear direction of the front seat based on a difference between the position in the front-rear direction of the front seat and a reference position in the front-rear direction of the front seat.

Adjusting the location of the front seat to the reference location may include adjusting an angle of a front seat backrest based on a difference between the angle of the front seat backrest and a reference angle of the front seat backrest.

The method may further include, returning the location of the front seat that is adjusted depending on whether the location of the front seat is the reference location to a previous location when the object is not detected around the rear seat.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
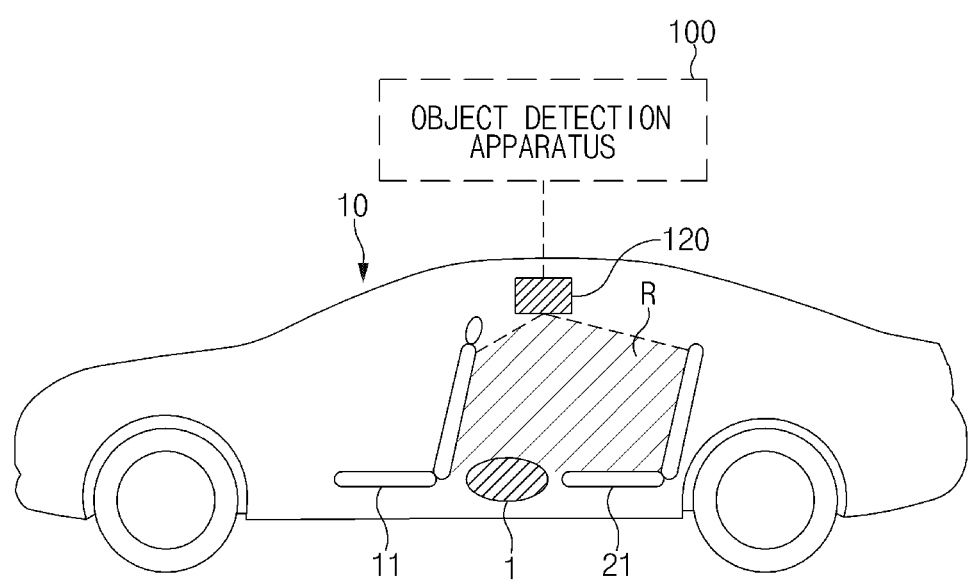
FIG. 1 is a drawing illustrating a vehicle to which an apparatus for detecting an object in a vehicle is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings. In adding reference denotations to elements of each drawing, although the same elements are displayed on a different drawing, it should be noted that the same elements have the same denotations. In addition, in describing a form of the present disclosure, if it is determined that a detailed description of related well-known configurations or functions blurs the gist of a form of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a vehicle to which an apparatus for detecting an object in a vehicle is applied, in some forms of the present disclosure.

As shown in FIG. 1, an apparatus 100 for detecting an object in a vehicle 10 (hereinafter referred to as "object detection apparatus 100") may include a sensor 120 located between a front seat 11 and a rear seat 21 of the vehicle 10. If both of passengers in the front seats 11 of the vehicle 10 exit the vehicle 10, the object detection apparatus 100 may detect an object 1 located around the rear seat 21 in the vehicle 10 by an operation of the sensor 120. As an example, the object 1 may correspond to, but is not limited to, an infant, a child with a small body, a companion animal, and/or the like. Further, the object 1 may correspond to any of passengers, each of which has a size at which it is not detected by the sensor 120 in a state where it is located in a shadow region generated by the front seat 11.

Thus, a description will be given in detail of a detailed configuration of the object detection apparatus 100 with reference to FIG. 2.

The object detection apparatus 100 in some forms of the present disclosure may be implemented in the vehicle 10. In this case, the object detection apparatus 100 may be integrated with internal control units of the vehicle 10. Alternatively, the object detection apparatus 100 may be implemented to be independent of the internal control units of the vehicle 10 and may be connected with the control units of the vehicle 10 by a separate connection means.

Figure 2:
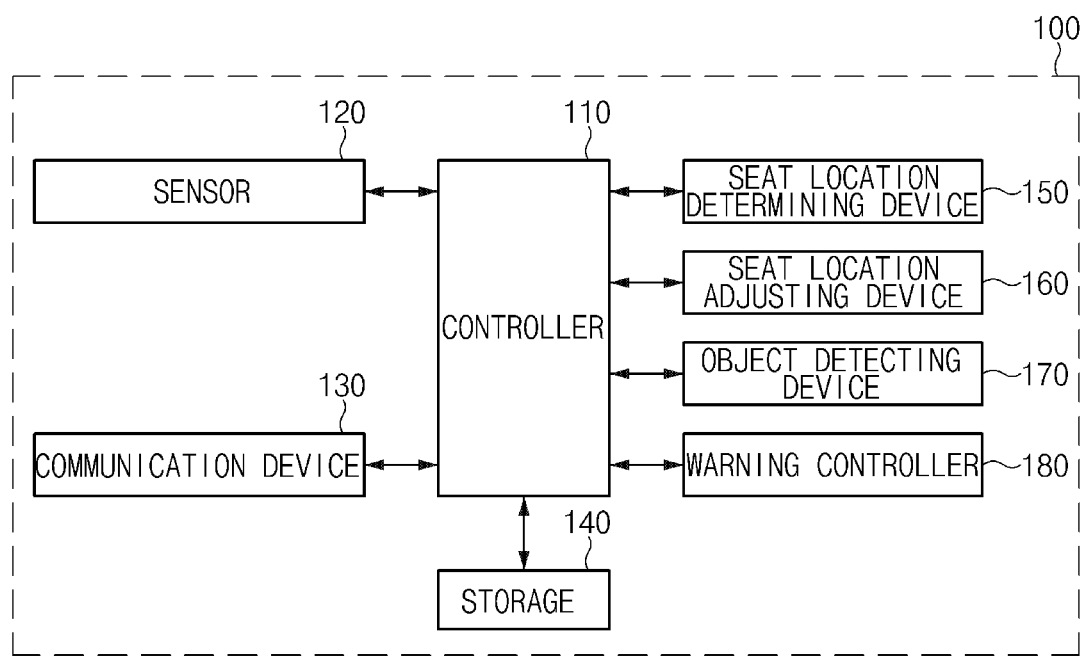
FIG. 2 is a block diagram illustrating a configuration of an apparatus for detecting an object in a vehicle.

FIG. 2 is a block diagram illustrating a configuration of an object detection apparatus in some forms of the present disclosure.

Referring to FIG. 2, an object detection apparatus 100 may include a controller 110, a sensor 120, a communication device 130, a storage 140, a seat location determining device 150, a seat location adjusting device 160, an object detecting device 170, and a warning controller 180. Herein, the controller 110, the seat location determining device 150, the seat location adjusting device 160, the object detecting device 170, and/or the warning controller 180 may be implemented as at least one or more processors.

The controller 110 may process a signal transmitted between the elements of the object detection apparatus 100.

The sensor 120 may detect an object 1 of FIG. 1, which remains around a rear seat 21 in a vehicle 10 of FIG. 1. Further, the sensor 120 may detect a front seat 11 located within a detection region R. As an example, the sensor 120 may be a radar sensor. One form of the present disclosure is exemplified as the sensor 120 is the radar sensor. However, according to an implementation form, another sensor of a type capable of detecting the object 1, for example, an ultrasonic sensor, a scanner, or a camera may be applied.

Herein, the sensor 120 may be located in the vehicle 10 and may be located between the front seat 11 and the rear seat 21 of the vehicle 10.

The communication device 130 may include a communication module for supporting a communication interface with electronics and/or control units mounted on the vehicle 10. As an example, the communication module may be communicatively connected with a power seat adjusting device in the vehicle 10 to receive location information of the front seat 11 and transmit a location adjustment signal of the front seat 11 to the power seat adjusting device. Further, the communication module may be communicatively connected with a warning system and/or a smart key system in the vehicle 10 to transmit a warning signal.

Herein, the communication module may include a module for supporting vehicle network communication such as controller area network (CAN) communication, local interconnect network (LIN) communication, or flex-ray communication.

Further, the communication module may include a module for wireless Internet access or a module for short range communication. Herein, wireless Internet technologies may include a wireless local area network (WLAN), wireless broadband (Wibro), wireless-fidelity (Wi-Fi), world interoperability for microwave access (Wimax), and the like. Short range communication technologies may include Bluetooth, ZigBee, ultra wideband (UWB), radio frequency identification (RFID), infrared data association (IrDA), and the like.

The storage 140 may store data, an algorithm, and/or the like necessary for operating the object detection apparatus 100.

As an example, the storage 140 may store detection information around the rear seat 21, received from the sensor 120, and may store reference location information of the front seat 11. Further, the storage 140 may store a command and/or an algorithm for controlling to detect or adjust a location of the front seat 11. Further, the storage 140 may store a command and/or an algorithm for controlling to output a warning when the object 1 around the rear seat 21 is detected.

Herein, the storage 140 may include storage media such as a random access memory (RAM), a static RAM (SRAM), a read-only memory (ROM), a programmable ROM (PROM), and an electrically erasable PROM (EEPROM).

If both of passengers in the front seats 11 of the vehicle 10 exit the vehicle 10, the controller 110 may activate an operation of each of the sensor 120, the seat location determining device 150, the seat location adjusting device 160, the object detecting device 170, and the warning controller 180 and may request to perform an operation for detecting the object 1 in the rear seat 21. In this case, after both of the passengers in the front seats 11 of the vehicle 10 exit the vehicle 10, the controller 110 may activate the operation of each of the sensor 120, the seat location determining device 150, the seat location adjusting device 160, the object detecting device 170, and the warning controller 180 only during a predetermined time.

First of all, if both of the passengers in the front seats 11 of the vehicle 10 exit the vehicle 10, the seat location determining device 150 may request the power seat adjusting device connected through the communication device 130 to provide a current location of the front seat 11 to determine the location of the front seat 11. If information about the current location of the front seat 11 is received from the power seat adjusting device, the seat location determining device 150 may determine whether the current location of the front seat 11 corresponds to a predefined reference location.

If the power seat adjusting device is not included in the vehicle 10 or if a current location of the front seat 11 is not stored, the seat location determining device 150 may control the sensor 120. In this case, the seat location determining device 150 may determine whether there is a shadow region generated by the front seat 11 in a detection region of the sensor 120 from a result of detection of the sensor 120 and may detect a location of the front seat 11 based on the result of the determination. As an example, the seat location determining device 150 may detect a current location of the front seat 11 based on a location where the front seat 11 is detected in the detection region of the sensor 120. Further, if the front seat 11 is detected in the detection region of the sensor 120, the seat location determining device 150 may detect a current location of the front seat 11 based on a size of a region where the front seat 11 is detected.

If the location of the front seat 11 is detected from the result of the detection of the sensor 120, the seat location determining device 150 may determine whether the detected location of the front seat 11 corresponds to a reference location. In this case, if the front seat 11 is detected from a region of a predetermined size or more in the detection region of the sensor 120, the seat location determining device 150 may determine that a current location of the front seat 11 is not the reference location.

If the location of the front seat 11 corresponds to the reference location, the seat location determining device 150 may transmit information about the location of the front seat 11 to the object detecting device 170 and/or the controller 110.

Meanwhile, if the location of the front seat 11 does not correspond to the reference location, the seat location determining device 150 may transmit information about the location of the front seat 11 to the seat location adjusting device 160 and/or the controller 110.

If information about a location of the front seat 11 is received from the seat location determining device 150 or the controller 110, the seat location adjusting device 160 may compare the received location information of the front seat 11 with reference location information predefined for the front seat 11.

Herein, the reference location information predefined for the front seat 11 may include reference position information in the front-rear direction of the front seat 11 and reference angle information of a front seat backrest. Further, if the sensor 20 detects a periphery of the rear seat 21, a reference position in a front-rear direction of the front seat 11 and a reference angle of the front seat backrest may be defined as a position and an angle where a shadow region is not generated in the detection region of the sensor 120. The reference position in the front-rear direction of the front seat 11 and the reference angle of the front seat backrest may be defined with reference to many test results.

The seat location adjusting device 160 may adjust the location of the front seat 11 based on the compared result. For example, the seat location adjusting device 160 may adjust a position in the front-rear direction of the front seat 11. Further, the seat location adjusting device 160 may adjust an angle of the front seat backrest.

In this case, the seat location adjusting device 160 may transmit a control signal to a driving unit for adjusting a location of the front seat 11. Further, the seat location adjusting device 160 may adjust a location of the front seat 11 by transmitting a positioning signal to the power seat adjusting device connected through the communication device 130.

The seat location adjusting device 160 may transmit the result of adjusting the location of the front seat 11 to the object detecting device 170 and/or the controller 110.

If it is determined that the location of the front seat 11 is the reference location by the seat location determining device 150 or if the location of the front seat 11 is adjusted to the reference location by the seat location adjusting device 160, the object detecting device 170 may control the sensor 120 and may detect the object 1 around the rear seat 21 in the vehicle 10 from a result of detection of the sensor 120.

In this case, since the front seat 11 is in the reference location, the sensor 120 may detect a periphery of the rear seat 21 in a state where there is no shadow region. Thus, the object detecting device 170 may detect the object 1 located around the rear seat 21 in the vehicle 10 from a result of detection of the sensor 120.

If detecting the object 1 located around the rear seat 21 in the vehicle 10 from the result of detection of the sensor 120, the object detecting device 170 may transmit the result of detecting the object 1 to the warning controller 180 and/or the controller 110.

Thus, if it is verified that the object 1 is detected by the object detecting device 170, the warning controller 180 may warn a user located outside that the object 1 remains in the vehicle 10 by outputting a warning. As an example, the warning controller 180 may output a warning sound through a speaker (not shown). Further, the warning controller 180 may turn on/off a lamp (not shown) while outputting the warning sound through the speaker.

In this case, the warning controller 180 may adjust and output warning intensity for each stage.

Further, the warning controller 180 may output a warning only during a predetermined time.

Herein, the warning controller 180 may transmit a control signal to a warning system in the vehicle 10 via the communication device 130 to output a warning by the warning system in the vehicle 10. Further, the warning controller 180 may transmit a control signal to a smart key system via the communication device 130 to output a warning via a smart key unit. Further, the warning controller 180 may generate a warning message and may transmit the generated warning message to a portable terminal of a previously registered user via the communication device 130.

Meanwhile, if the object 1 is not detected around the rear seat 21 in the vehicle 10 from the result of the detection of the sensor 120, the object detecting device 170 may release the operation of the sensor 120.

If a location of the front seat 11 is adjusted by the seat location adjusting device 160 to detect the object 1, the object detecting device 170 may transmit the result of detecting the object 1 to the seat location adjusting device 160 and/or the controller 110. In this case, the seat location adjusting device 160 may return the location of the front seat 11, adjusted to the reference location, to a previous location.

FIGS. 3A to 6 are drawings illustrating an operation of an apparatus for detecting an object in a vehicle in some forms of the present disclosure.

Figure 3A:
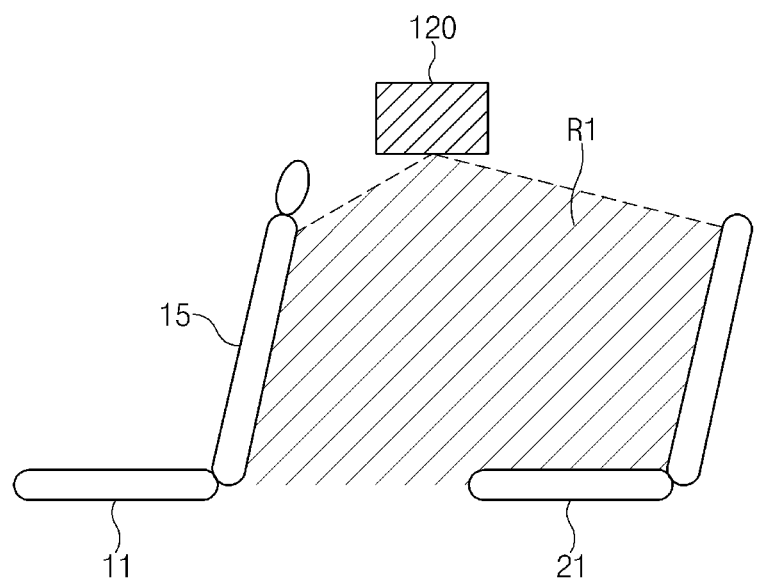
FIGS. 3A, 3B, 4, 5A, 5B, 5C and 6 are drawings illustrating an operation of an apparatus for detecting an object in a vehicle.
Figure 3B:
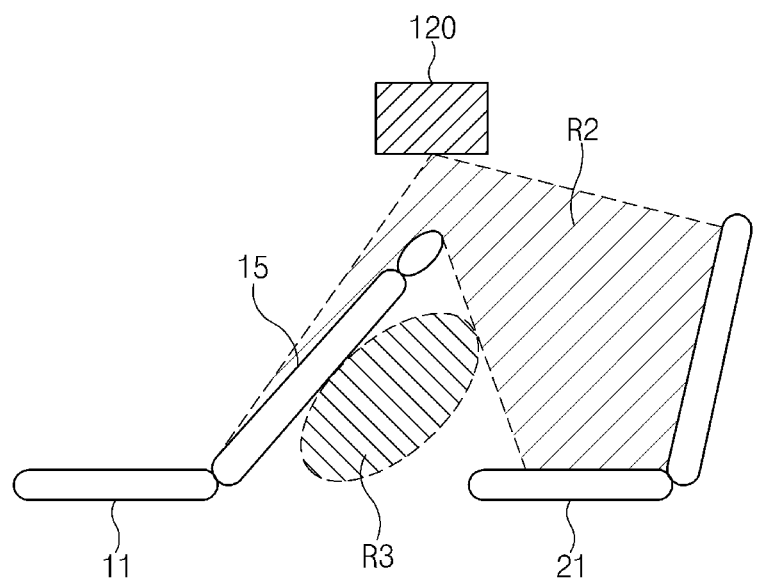

FIGS. 3A and 3B are drawings illustrating an implementation of determining a location of a front seat through a sensor in some forms of the present disclosure.

A seat location determining device 150 of FIG. 2 may determine a location of a front seat 11 based on current location information of the front seat 11, stored in a storage 140 of FIG. 2, or current location information of the front sat 11, received from a power seat adjusting device in a vehicle 10 of FIG. 1.

However, if the power seat adjusting device is not included in the vehicle 10 or if a current location of the front seat 11 is not stored, the seat location determining device 150 may determine a location of the front seat 11 depending on whether there is a shadow region generated by the front seat 11 in a detection region of the sensor 120.

As shown in FIG. 3A, if a front seat backrest 15 is placed at less than a predetermined angle in a state where the front seat 11 is pulled forward, a shadow region may fail to be generated in a detection region R1 of the sensor 120.

Thus, if it is verified that there is no shadow region in the detection region R1 of the sensor 120 from a result of detection of the sensor 120, the seat location determining device 150 may determine that the front seat 11 is in a reference location.

Meanwhile, as shown in FIG. 3B, if the front seat backrest 15 is inclined at the predetermined angle or more in a state where the front seat 11 is moved backward, a shadow region R3 may be generated by the front seat 11 and a detection region R2 capable of detecting an object by the sensor 120 may be narrowed due to the shadow region R3.

Thus, if it is verified that there is the shadow region R3 in the detection region R1 of the sensor 120 from the result of the detection of the sensor 120, the seat location determining device 150 may determine that the front seat 11 is not in the reference location.

Figure 4:
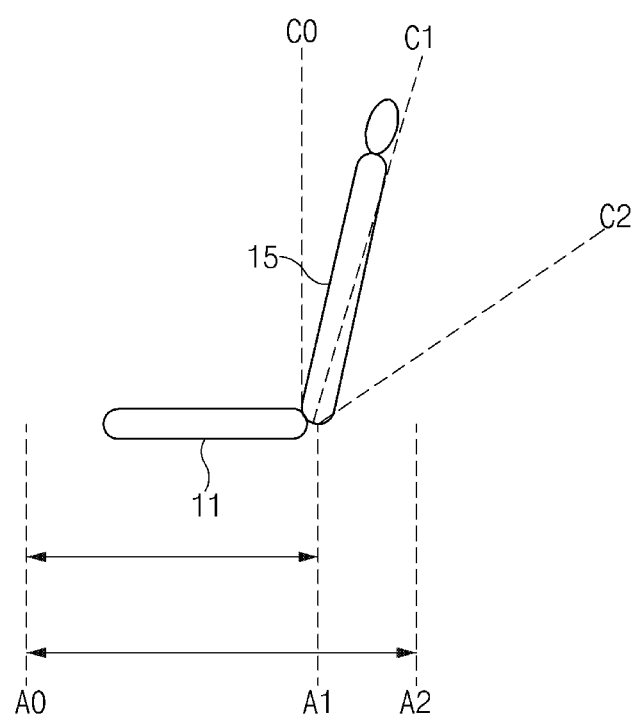

FIG. 4 is a drawing illustrating a reference location of a front seat in some forms of the present disclosure.

Referring to FIG. 4, a range capable of being adjusted in position in the front-rear direction of a front seat 11 may correspond to a range of A0-A2. If a sensor 120 of FIG. 2 detects a periphery of a rear seat 21 of FIG. 1, a reference position in the front-rear direction of the front seat 11 may be defined as a position where a shadow region is not generated in a detection region of the sensor 120.

For example, the reference position in the front-rear direction of the front seat 11 may be defined as a position between A0 and A1. Thus, if a position in the front-rear direction of the front seat 11 corresponds to a position between A0 and A2, a seat location adjusting device 160 of FIG. 2 may adjust the position in the front-rear direction of the front seat 11 to the position between A0 and A1.

Further, an angle range capable of being adjusted in a front seat backrest 15 may correspond to a range of C0-C2. Similarly, if the sensor 120 detects a periphery of the rear seat 21, a reference angle of the front seat backrest 15 may be defined as an angle at which a shadow region is not generated in the detection region of the sensor 120.

For example, the reference angle of the front seat backrest 15 may be defined as an angle between C0 and C1. Thus, if an angle of the front seat backrest 15 corresponds to an angle between C1 and C2, the seat location adjusting device 160 may adjust the angle of the front seat backrest 15 to the angle between C0 and C1.

Figure 5A:
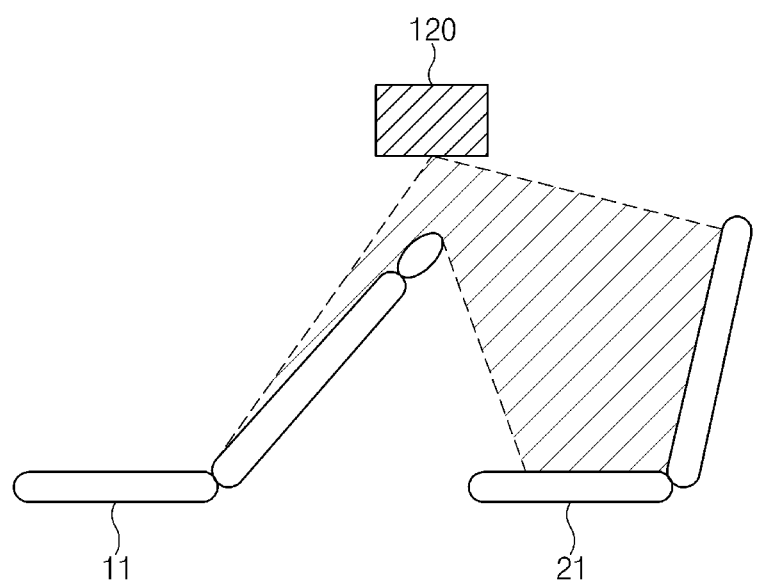
Figure 5B:
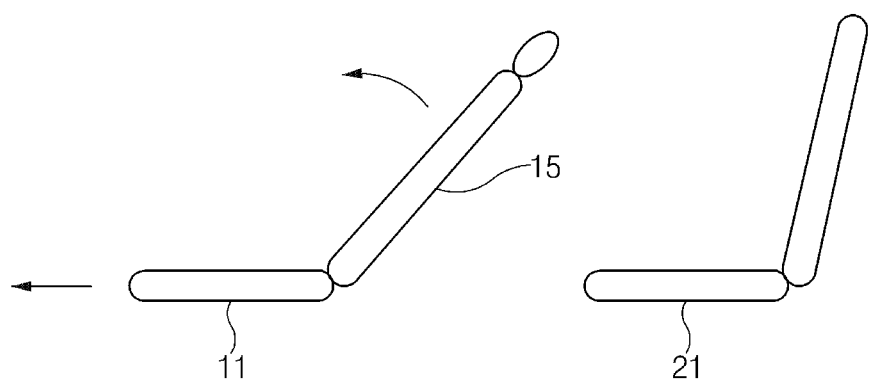
Figure 5C:
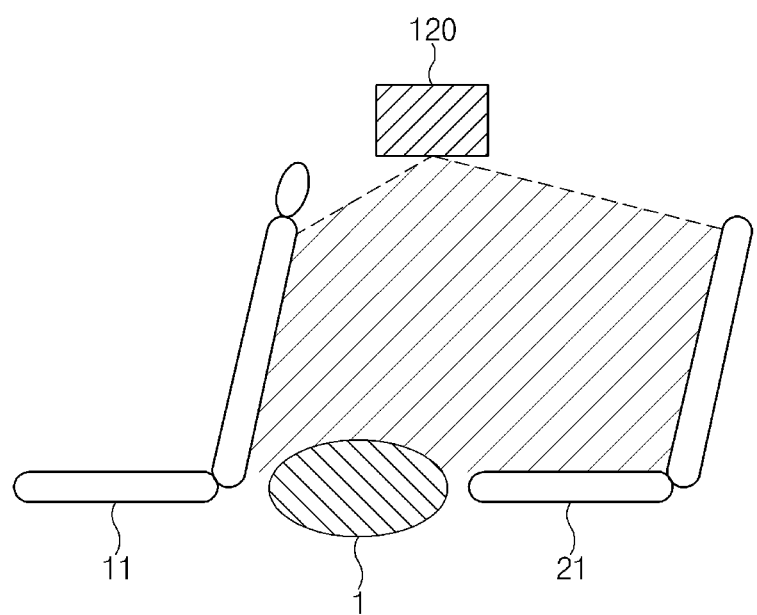

FIGS. 5A to 5C are drawings illustrating an implementation of detecting an object around a rear seat in a vehicle after adjusting a location of a front seat in some forms of the present disclosure.

As shown in FIG. 5A, if a shadow region is generated in a detection region of a sensor 120 of FIG. 2, a seat location determining device 150 of FIG. 2 may determine that a front seat 11 is not in a reference location. Further, the seat location determining device 150 may determine that the front seat 11 is not in the reference location from current location information of the front seat 11, stored in a storage 140 of FIG. 2.

In this case, as shown in FIG. 5B, a seat location adjusting device 160 of FIG. 2 may adjust a position in the front-rear direction of the front seat 11 to a reference position and may adjust an angle of a front seat backrest 15 to a reference angle.

Thus, as shown in FIG. 5C, an object detecting device 170 of FIG. 2 may detect an object 1 located between the front seat 11 and a rear seat 21 in a state where a detection region around the rear seat 21 is obtained to have high accuracy.

Figure 6:
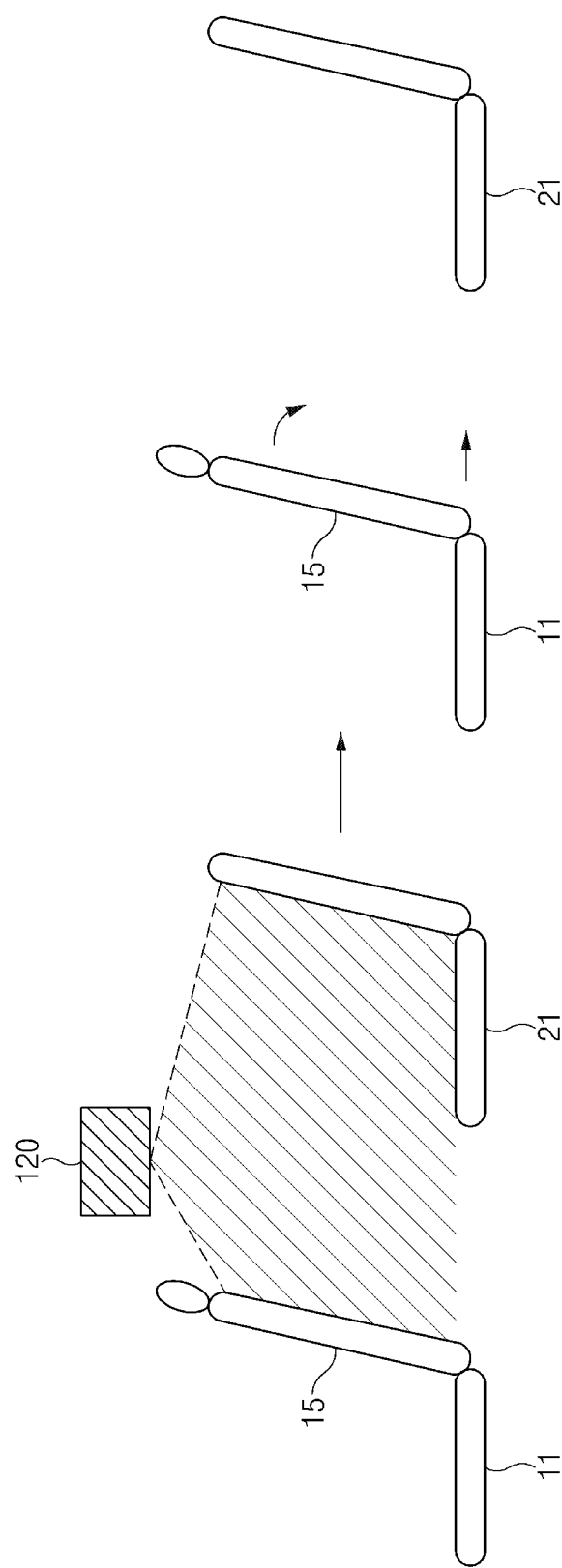

FIG. 6 is a drawing illustrating an implementation of returning a location of a front seat after detecting an object around a rear seat in a vehicle in some forms of the present disclosure.

In a state where a position in the front-rear direction of a front seat 11 and/or an angle of a front seat backrest 15 is adjusted to detect an object as shown in FIG. 5B, if an operation of detecting the object around a rear seat 21 is completed, a controller 110 of FIG. 2 may request a seat location adjusting device 160 of FIG. 2 to adjust a location of the front seat 11 if the object is not detected.

Thus, if the detection of the object is completed, as shown in FIG. 6, the seat location adjusting device 160 may return a position in the front-rear direction of the front seat 11 and/or an angle of the front seat backrest 15 to a previous position and/or a previous angle. Thus, a user may ride in a vehicle upon a next ride without changing a seat location when he or she last exits the vehicle.

An object detection apparatus 100 in some forms of the present disclosure, which operates in the above-mentioned manner, may be implemented in the form of an independent hardware device including a memory and a processor for processing each operation or may be driven in the form of being included in another hardware device such as a microprocessor or a universal computer system.

A description will be given of an operation of the object detection apparatus 100 in some forms of the present disclosure, including the above-mentioned configuration.

Figure 7:
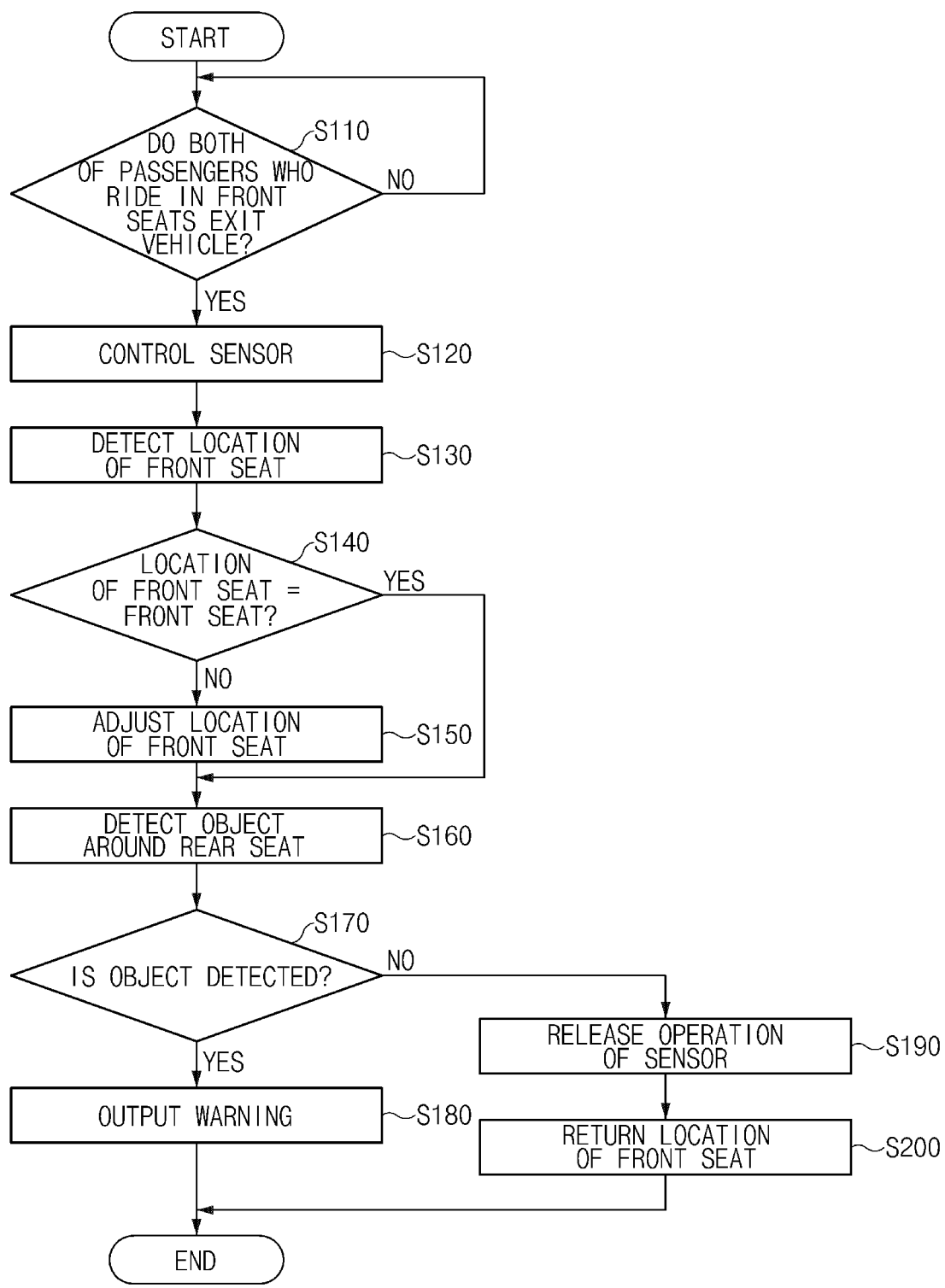
FIG. 7 is a flowchart illustrating an operation of a method for detecting an object in a vehicle.

FIG. 7 is a flowchart illustrating an operation of a method for detecting an object in a vehicle in some forms of the present disclosure.

Referring to FIG. 7, if both of passengers in front seats 11 of a vehicle 10 of FIG. 1 exit the vehicle 10 in operation S110, in operations S130 and S140, an object detection apparatus 100 of FIG. 2 may detect a current location of the front seat 11 and may determine whether the current location of the front seat 11 is a reference location.

In operation S130, the object detection apparatus 100 may receive and verify current location information of the front seat 11 from a power seat adjusting device or may verify location information of the front seat 11, previously stored in a storage 140 of FIG. 2. Further, in operations S120 and S130, the object detection apparatus 100 may control the sensor 120 located between the front seat 11 and a rear seat 21 of FIG. 1 and may determine whether there is a shadow region in a detection region of the sensor 120 to detect location information of the front seat 11.

If determining that the location of the front seat 11 is the reference location in operation S140, that is, if determining that a position in the front-rear direction of the front seat 11 and an angle of a front seat backrest 15 are a reference position and a reference angle, respectively, the object detection apparatus 100 may control the sensor 120. In this case, in operation S160, the sensor 120 may detect an object around the rear seat 21.

Meanwhile, if determining that the location of the front seat 11 is not the reference location in operation S140, in operation S150, the object detection apparatus 100 may compare the location of the front seat 11 with the reference location and may adjust the location of the front seat 11 based on the compared result. In this case, the object detection apparatus 100 may adjust a position in the front-rear direction of the front seat 11 to a reference position and may adjust an angle of the front seat backrest 15 to a reference angle. Of course, the object detection apparatus 100 may adjust only a position in the front-rear direction of the front seat 11 or may adjust only an angle of the front seat backrest 15.

Herein, if the adjusted position in the front-rear direction of the front seat 11 and the adjusted angle of the front seat backrest 15 are the reference position and the reference angle, respectively, the object detection apparatus 100 may control the sensor 120. In this case, in operation S160, the sensor 120 may detect an object around the rear seat 21.

If the object is detected based on the result of the detection in operation S160 in operation S170, in operation S180, the object detection apparatus 100 may output a warning. In operation S180, the object detection apparatus 100 may control a speaker and/or a lamp of the vehicle 10 to output a warning. Further, the object detection apparatus 100 may transmit object detection information to a warning system and/or a smart key system in the vehicle 10 to output a warning through the warning system and/or the smart key system in the vehicle 10.

Meanwhile, if the object is not detected in operation S170, in operation S190, the object detection apparatus 100 may release the operation of the sensor 120. In operation S200, the object detection apparatus 100 may return the location of the front seat 11, adjusted in operation S150, to a previous location and may end the related operation. If operation S150 is not performed, operation S200 may be omitted.

Figure 8:
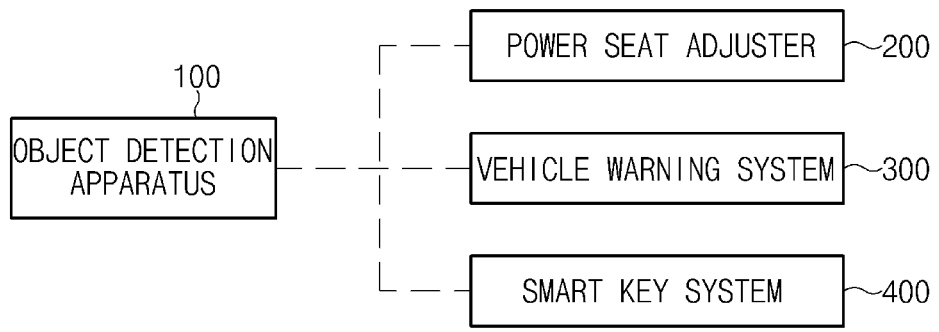
FIG. 8 is a block diagram illustrating a vehicle system.

FIG. 8 is a block diagram illustrating a vehicle system in some forms of the present disclosure.

Referring to FIG. 8, the vehicle system may include an object detection apparatus 100, a power seat adjusting device 200, a vehicle warning system 300, and/or a smart key system 400.

The object detection apparatus 100 may receive current location information of a front seat 11 of FIG. 1 from the power seat adjusting device 200. Further, if a location of the front seat 11 is not a reference location, the object detection apparatus 100 may request the power seat adjusting device 200 to adjust the location of the front seat 11. Further, if an object detection operation is completed, the object detection apparatus 100 may request the power seat adjusting device 200 to adjust the location of the front seat 11 again.

Thus, the power seat adjusting device 200 may control a seat positioning unit depending on a request of the object detection apparatus 100 to adjust a location of the front seat 11.

If an object is detected around a rear seat 21 of FIG. 1, the object detection apparatus 100 may transmit object detection information to the vehicle warning system 300 and/or the smart key system 400. Thus, the vehicle warning system 300 and/or the smart key system 400 may output a warning based on the information received from the object detection apparatus 100.

As described above, in some forms of the present disclosure, the sensor 120 may be prevented from failing to detect an object around the rear seat 21 since a shadow region is generated due to the front seat 11. Thus, the accuracy of detecting the object located around the rear seat 21 may be enhanced.

Figure 9:
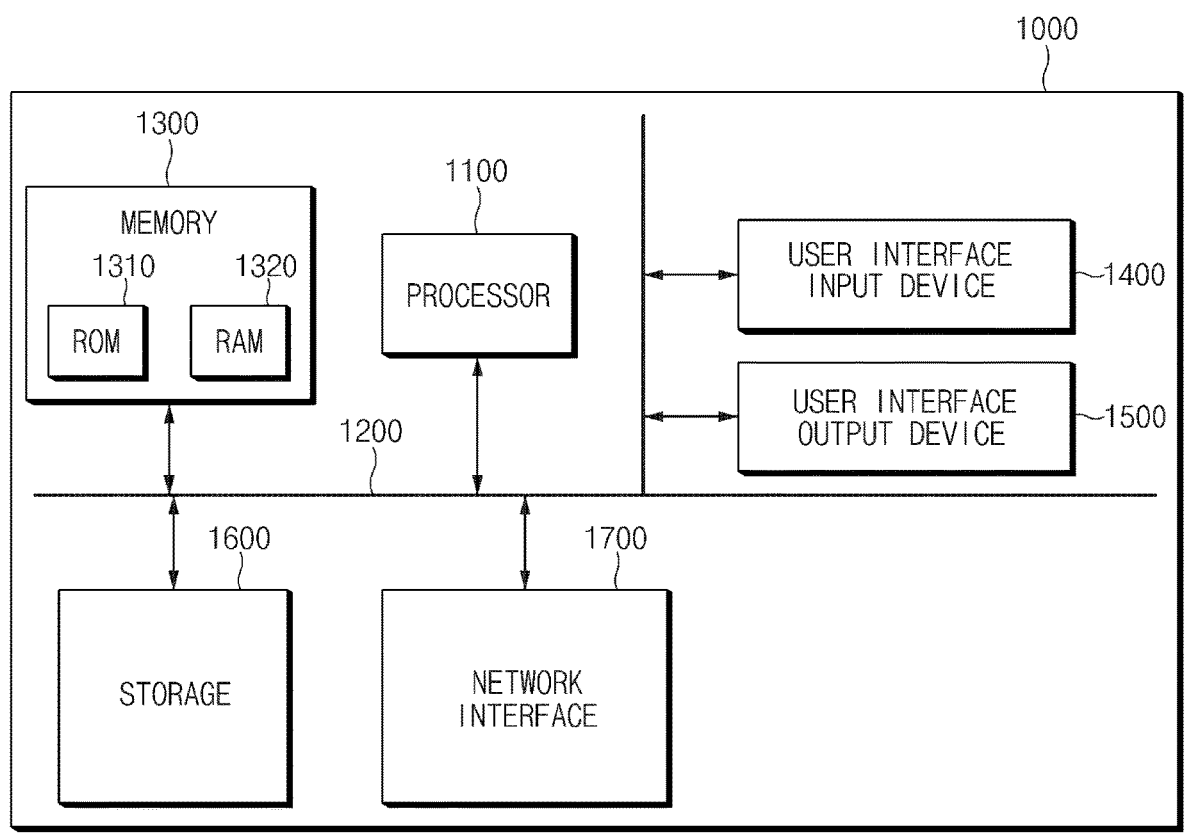
FIG. 9 is a block diagram illustrating a configuration of a computing system in which a method is executed.

FIG. 9 is a block diagram illustrating a configuration of a computing system in which a method in some forms of the present disclosure is executed.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in some forms of the present disclosure may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a user terminal. Alternatively, the processor and storage medium may reside as a separate component of the user terminal.

In some forms of the present disclosure, the object detection apparatus may inhibit an object located in a shadow region generated by the front seat from being undetected. This can be done by adjusting a location of a front seat to a predetermined location before detecting an object around a rear seat, thus enhancing the accuracy of detecting the object located around the rear seat.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for detecting an object in a vehicle, the apparatus comprising:
   a seat location determining device configured to determine whether a location of a front seat is a reference location;
   a seat location adjusting device configured to adjust the location of the front seat to the reference location depending on whether the seat location determining device determines that the location of the front seat is the reference location;
   an object detecting device configured to detect an object around a rear seat when the location of the front seat is the reference location; and
   a warning controller configured to output a warning when the object detecting device detects the object around the rear seat.

2. The apparatus of claim 1, wherein the apparatus further comprises:
   a storage configured to store location information of the front seat,
   wherein the seat location determining device is configured to determine whether the location of the front seat is the reference location based on the location information of the front seat.

3. The apparatus of claim 1, wherein the apparatus further comprises:
   a communication device configured to transmit and receive a signal with a power seat adjusting device in the vehicle,
   wherein the seat location determining device is configured to determine whether the location of the front seat is the reference location based on the location information of the front seat that is received from the power seat adjusting device via the communication device.

4. The apparatus of claim 1, wherein the seat location determining device is configured to:
   control a sensor located between the front seat and the rear seat; and
   determine whether the location of the front seat is the reference location based on the location information of the front seat that is detected in a detection region of the sensor.

5. The apparatus of claim 1, wherein the seat location determining device is configured to:
   detect the location of the front seat and compare the location of the front seat with the reference location when passengers in the front seat exit the vehicle.

6. The apparatus of claim 1, wherein the reference location comprises:
   information regarding a reference position in a front-rear direction of the front seat; and
   information regarding a reference angle of a front seat backrest.

7. The apparatus of claim 6, wherein the seat location adjusting device is configured to:
   adjust a position in the front-rear direction of the front seat based on a difference between the position of the front seat and the reference position in the front-rear direction of the front seat.

8. The apparatus of claim 6, wherein the seat location adjusting device is configured to:
   adjust an angle of the front seat backrest based on a difference between the angle of the front seat backrest and the reference angle of the front seat backrest.

9. The apparatus of claim 1, wherein the seat location adjusting device is configured to:
   return the location of the front seat that is adjusted by the seat location adjusting device to a previous location when the object detecting device does not detect the object around the rear seat.

10. The apparatus of claim 1, wherein the warning controller is configured to:
    output the warning through at least one of a speaker or a vehicle lamp.

11. The apparatus of claim 1, wherein the warning controller is configured to:
    transmit a warning signal to at least one of a warning system in the vehicle, a smart key system in the vehicle, or a pre-registered portable terminal.

12. The apparatus of claim 1, wherein the object detecting device is configured to:
   control a sensor located between the front seat and the rear seat; and
   detect the object around the rear seat via the sensor.

13. A method for detecting an object in a vehicle, the method comprising:
   determining whether a location of a front seat is a reference location;
   adjusting the location of the front seat to the reference location depending on whether the location of the front seat is the reference location;
   detecting the object around a rear seat when the location of the front seat is the reference location; and
   outputting a warning when the object is detected around the rear seat.

14. The method of claim 13, wherein the method further comprises:
   storing location information of the front seat,
   wherein determining whether the location of the front seat is the reference location is based on the location information of the front seat.

15. The method of claim 13, wherein determining whether the location of the front seat is the reference location further comprises:
   receiving the location information of the front seat from a power seat adjusting device in the vehicle; and
   determining whether the location of the front seat is the reference location based on the location information of the front seat.

16. The method of claim 13, wherein determining whether the location of the front seat is the reference location further comprises:
   controlling a sensor; and
   determining whether the location of the front seat is the reference location based on the location information of the front seat that is detected in a detection region of the sensor.

17. The method of claim 13, wherein the method further comprises:
   detecting the location of the front seat and comparing the location of the front seat with the reference location when passengers in the front seat exit the vehicle before determining whether the location of a front seat is the reference location.

18. The method of claim 13, wherein adjusting the location of the front seat to the reference location comprises:
   adjusting a position in a front-rear direction of the front seat based on a difference between the position in the front-rear direction of the front seat and a reference position in the front-rear direction of the front seat.

19. The method of claim 13, wherein adjusting the location of the front seat to the reference location comprises:
   adjusting an angle of a front seat backrest based on a difference between the angle of the front seat backrest and a reference angle of the front seat backrest.

20. The method of claim 13, wherein the method further comprises:
   returning the location of the front seat that is adjusted depending on whether the location of the front seat is the reference location to a previous location when the object is not detected around the rear seat.

* * * * *